(12) United States Patent
Takeuchi et al.

(10) Patent No.: US 8,317,246 B2
(45) Date of Patent: Nov. 27, 2012

(54) ASSIST GRIP MOUNTING STRUCTURE

(75) Inventors: Eiji Takeuchi, Shizuoka-ken (JP); Akihito Miura, Shizuoka-ken (JP)

(73) Assignee: Suzuki Motor Corporation (JP)

( * ) Notice: Subject to any disclaimer, the term of this patent is extended or adjusted under 35 U.S.C. 154(b) by 113 days.

(21) Appl. No.: 12/843,174

(22) Filed: Jul. 26, 2010

(65) Prior Publication Data

US 2011/0049923 A1    Mar. 3, 2011

(30) Foreign Application Priority Data

Aug. 25, 2009    (JP) ................................. 2009-194454

(51) Int. Cl.
    *B60J 9/00*    (2006.01)
(52) U.S. Cl. .................... 296/1.02; 296/214; 224/927
(58) Field of Classification Search ................. 296/1.02, 296/214; 224/313, 927; 16/DIG. 12
    See application file for complete search history.

(56) References Cited

U.S. PATENT DOCUMENTS

| | | | | |
|---|---|---|---|---|
| 5,366,127 A | * | 11/1994 | Heinz | 224/313 |
| 6,065,657 A | * | 5/2000 | Fischer | 224/313 |
| 6,397,435 B1 | * | 6/2002 | Gosselet | 16/438 |
| 6,692,067 B2 | * | 2/2004 | Inari et al. | 296/214 |
| 7,103,939 B2 | | 9/2006 | Belchine, III et al. | |
| 2005/0248167 A1 | * | 11/2005 | Totani et al. | 296/1.02 |
| 2007/0267884 A1 | * | 11/2007 | Failla et al. | 296/1.02 |
| 2008/0111389 A1 | * | 5/2008 | Benkler et al. | 296/1.02 |

FOREIGN PATENT DOCUMENTS

JP    2005-138823    6/2005
JP    2009078696 A * 4/2009

\* cited by examiner

*Primary Examiner* — Glenn Dayoan
*Assistant Examiner* — Jason S Daniels
(74) *Attorney, Agent, or Firm* — Myers Bigel Sibley & Sajovec, PA

(57) ABSTRACT

In an assist grip mounting structure, a pair of mounting parts 15 of an assist grip 10 are attached individually to a pair of mounted parts 5 on the roof side inner panel 2 side, and a coat hook part 20 projects from the one mounting part 15 side, a reinforcing plate 30 for reinforcing the coat hook part 20 overlaps a back surface 20U of the coat hook part 20.

8 Claims, 6 Drawing Sheets

ASSIST GRIP MOUNTING STRUCTURE

CROSS-RELATED APPLICATIONS

This application claims priority from Japanese Patent Application No. 2009-194454; filed Aug. 25, 2009, the disclosure of which is incorporated herein by reference in its entirety.

BACKGROUND OF THE INVENTION

1. Field of the Invention

The present invention relates to an assist grip mounting structure in which a pair of mounting parts of an assist grip is attached individually to a pair of mounted parts on the roof-side inner panel side, and a coat hook part projects from the one mounting part side.

2. Description of Related Art

A vehicle body of an automobile is provided with a curtain airbag serving as a means for protecting passengers in a vehicle compartment from a collision with another automobile or the like with a vehicle side surface. This curtain airbag is formed into a elongated shape by being folded into a bag body formed of a kind of cloth, and is provided on the front pillar and roof side so as to extend along a door opening of the front pillar and roof side. When the automobile collides, the bag body is instantaneously expanded by a gas supplied from an inflator, and is deployed to the vehicle interior side while pushing the edges of a front pillar trim and a roof lining open to protect the passengers from the side of the vehicle body. In this case, the edge of the roof lining pushed open by the curtain airbag or the curtain airbag presses the coat hook part.

Conventionally, the coat hook part has been formed into one plate shape, so that when the curtain airbag is expanded and deployed, a pressing force applied from the roof lining (specifically, a pressing force applied from the curtain airbag via the roof lining) has been received by the coat hook part only (refer to Patent Document 1).

Patent Document 1: JP 2005-138823 A

According to the above-described conventional configuration, since the pressing force applied from the roof lining has been received by the coat hook part only, the coat hook part has been unable to withstand the pressing force, and has been broken in some cases.

SUMMARY OF THE INVENTION

An object of the present invention is to provide an assist grip mounting structure capable of improving the durability of a coat hook part.

The present invention is characterized by an assist grip mounting structure in which a pair of mounting parts of the assist grip is attached individually to a pair of mounted parts on the roof side inner panel side; and a coat hook part projects from the one mounting part side, wherein a reinforcing plate for reinforcing the coat hook part overlaps on a back surface of the coat hook part.

According to this configuration, the coat hook part can be reinforced by the reinforcing plate overlapping on the back surface of the coat hook part. As a result, when a curtain airbag is expanded and deployed, even if the coat hook part receives a pressing force applied from the curtain airbag via a roof lining, the coat hook part can withstand the pressing force, so that the coat hook part can be made less liable to be broken.

In the present invention, if the coat hook part is provided integrally with the one mounting part, the number of parts can be decreased, and the construction can be simplified.

In the present invention, if a first protrusion projects from the back surface of the coat hook part;

a first insertion hole is formed in the reinforcing plate, and the first protrusion is inserted through the first insertion hole; and a retaining member for preventing the first protrusion from coming off the first insertion hole is attached to the first protrusion, the effect described below can be achieved.

Before the paired mounting parts of the assist grip are attached individually to the paired mounted parts on the roof side inner panel side, the reinforcing plate can be subassembled with the coat hook part. Therefore, the reinforcing plate and the coat hook part need not be transported and controlled separately, so that the transportation and control of parts can be simplified.

In the present invention, if one end part of the reinforcing plate is fixed so as to be held between the one mounting part and one mounted part, and the one end part of the reinforcing plate and the one mounted part are overlapped on each other, the pressing force applied from the curtain airbag can be absorbed by the mounted part, so that the coat hook part can further be made less liable to be broken. That is, in the structure in which the reinforcing plate and the one mounted part are separate from each other, the pressing force applied from the curtain airbag is received by the reinforcing plate and the coat hook part. According to the above-described configuration of the present invention, since the one end part of the reinforcing plate is fixed so as to be held between the one mounting part and the one mounted part, the pressing force applied from the curtain airbag can also be absorbed by the mounted part via the reinforcing plate, so that the coat hook part can further be made less liable to be broken.

In the present invention, if a second insertion hole is formed in the one end part of the reinforcing plate;

a third insertion hole overlapping on the second insertion hole is formed in the mounted part;

a second protrusion projects from the back surface of the coat hook part; and the second protrusion is inserted through the second insertion hole and the third insertion hole, the effects described below can be achieved.

Even if a pressing force is applied to the coat hook part from the curtain airbag via the roof lining, the positional shift of the reinforcing plate can be avoided, the overlapping portion of the one end part of the reinforcing plate and the one mounted part can be secured, so that the coat hook part can further be made less liable to be broken. Also, a scattering prevention effect in the case in which the coat hook part is broken by chance can be achieved, and the overlapping portion can be used for positioning the reinforcing plate.

In the present invention, if a support bracket for the assist grip is joined to the roof side inner panel; and the mounted part is formed on the support bracket, the assist grip can be supported firmly by the roof side inner panel via the support bracket. If the one end part of the reinforcing plate is fixed so as to be held between the mounting part of the assist grip and the mounted part thereof, a force such as to pull the coat hook part to the vehicle interior side can also be absorbed by the mounted part via the reinforcing plate, so that the strength of the coat hook part can be further increased.

According to the present invention, an assist grip mounting structure capable of improving the durability of the coat hook part can be provided.

DETAILED DESCRIPTION OF PREFERRED EMBODIMENTS

The present invention now will be described more fully hereinafter in which embodiments of the invention are provided with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise.

Unless otherwise defined, all technical and scientific terms used herein have the same meaning as commonly understood by one of ordinary skill in the art to which this invention belongs.

Figure 1:
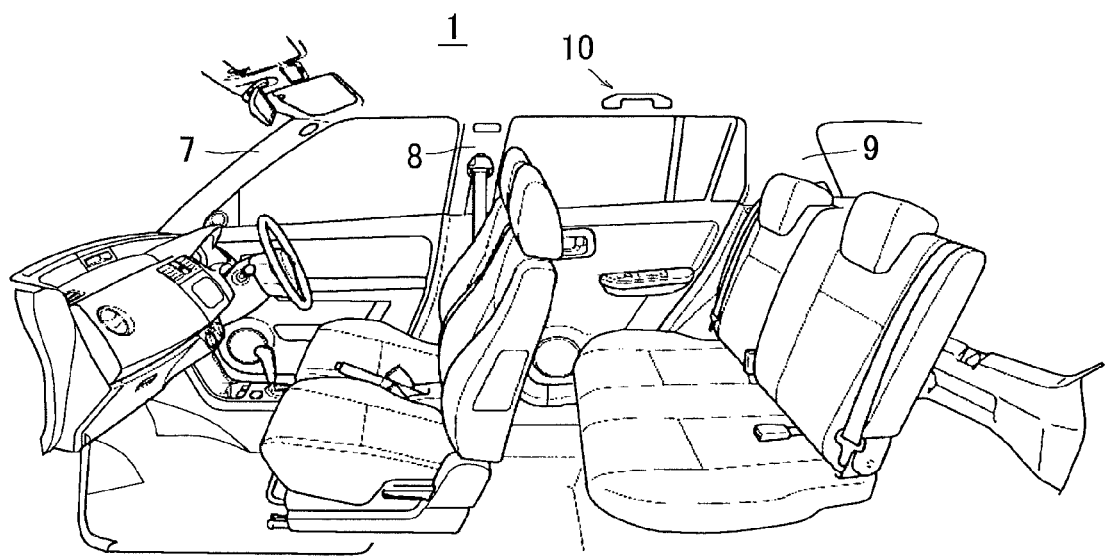
FIG. 1 is a perspective view showing the interior of a vehicle compartment of an automobile.
Figure 2:
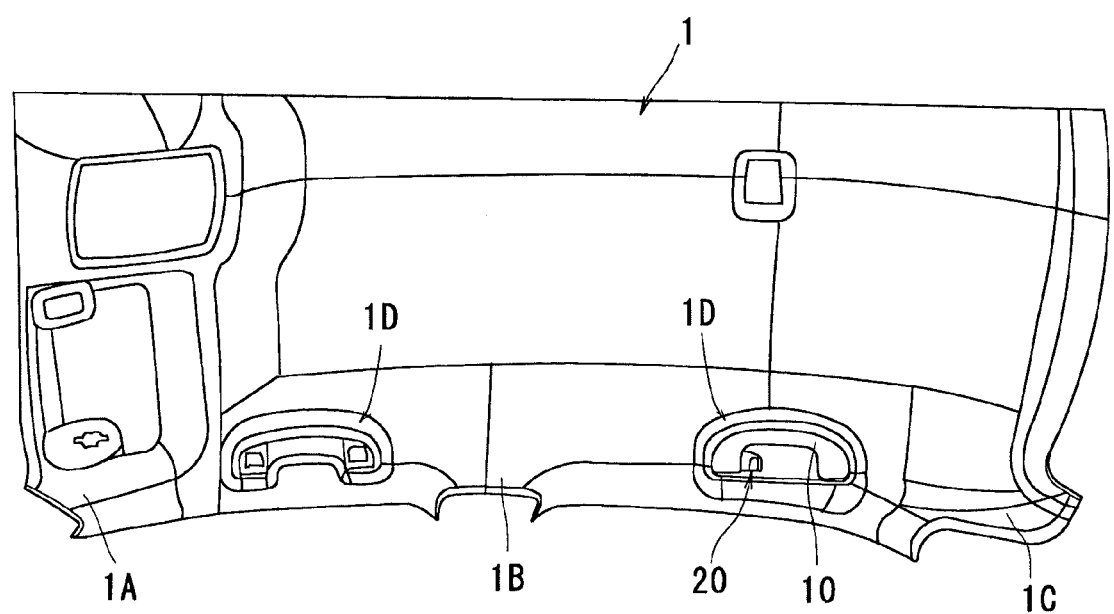
FIG. 2 is a view of a ceiling of an automobile, viewed from the vehicle compartment interior side.

As shown in FIGS. 1 and 2, a roof lining 1 covering a ceiling is located above door openings formed in the side portion of a vehicle body of an automobile, and side parts 1A, 1B and 1C of the roof lining 1 above an A pillar 7, a B pillar 8, and a C pillar 9 arranged in that order from the vehicle front side extend downward to locations covering the upper end portions of the A pillar 7, the B pillar 8, and the C pillar 9.

Between the side part 1A above the A pillar 7 and the side part 1B above the B pillar 8 and between the side part 1B above the B pillar 8 and the side part 1C above the C pillar 9 of the vehicle side part of the roof lining 1, a storage recesses 1D for assist grips 10 are formed, and the assist grip 10 is stored in each of the storage recesses 1D (in FIGS. 1 and 2, the assist grip 10 in the storage recess 1D on the vehicle front side is not shown).

As shown in FIGS. 7 to 10, a curtain airbag 51 is provided as a means for protecting passengers in a vehicle compartment from a collision with another automobile or the like with a vehicle side surface. The curtain airbag 51 is formed into an elongated shape by being folded into a bag body formed of a kind of cloth, and is provided on the front pillar and roof side so as to extend along a door opening of the front pillar and roof side.

When the automobile collides, the bag body is instantaneously expanded by a gas supplied from an inflator, and is deployed to the vehicle compartment interior side while pushing the edges of a front pillar trim and the roof lining 1 open to protect the passengers from the side of the vehicle body. In this case, the edge of the roof lining 1 pushed open by the curtain airbag 51 presses a coat hook part 20, described later, of the assist grip 10.

Figure 3:
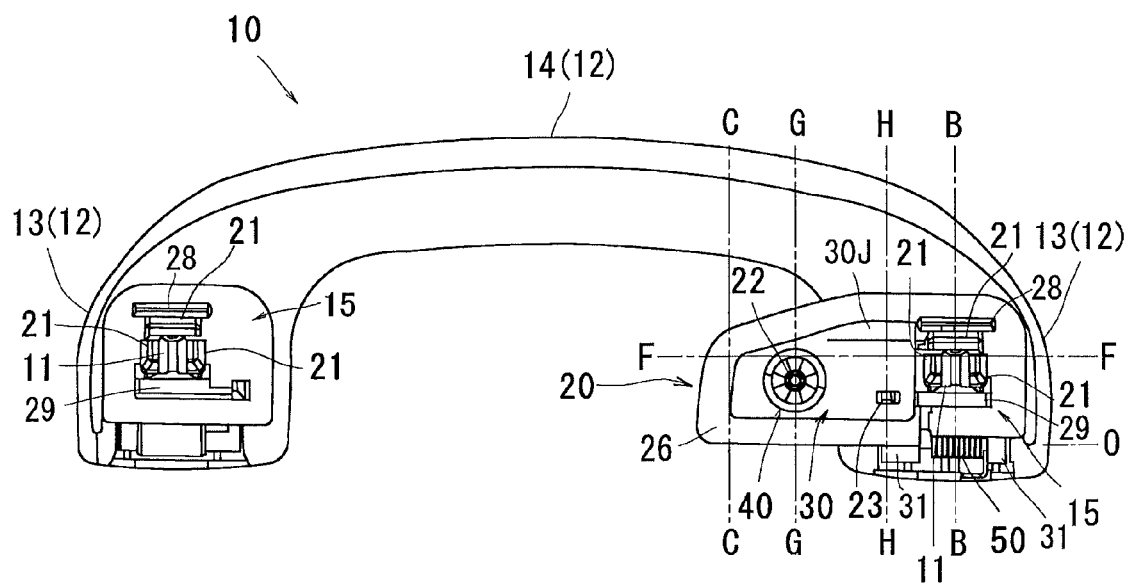
FIG. 3 is a view of an assist grip, viewed from the back side (vehicle outside)
Figure 4:
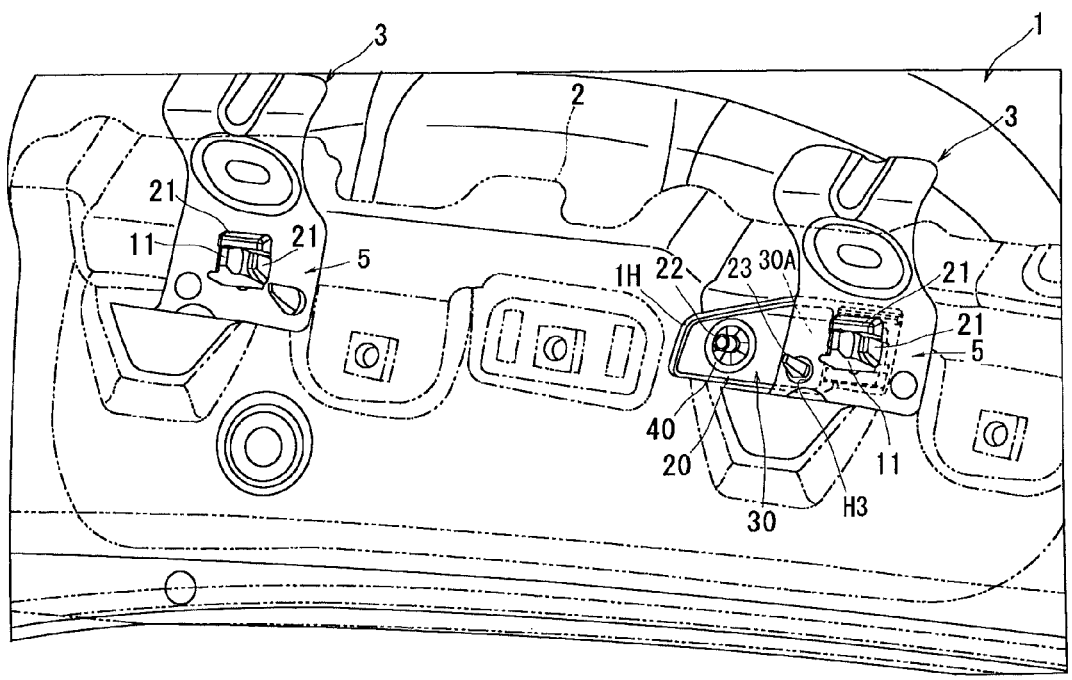
FIG. 4 is a perspective view of an assist grip mounting structure, viewed from the back side (vehicle outside)

As shown in FIGS. 2, 3 and 4, a pair of rectangular plate shaped mounting parts 15 for the assist grip 10 is attached individually to a pair of mounted parts 5 on the roof side inner panel 2 side. A body part 12 of the assist grip 10 consists of a pair of short leg parts 13 and a gripping part 14 that connects one-end portions of both the leg parts 13 with each other and is long in the vehicle longitudinal direction, and the other-end portions of the paired leg parts 13 are connected individually to the paired mounting parts 15 via pins 19 (refer to FIGS. 7 and 8) so as to be rotatable around an axis 0 extending along the vehicle longitudinal direction.

Figure 5:
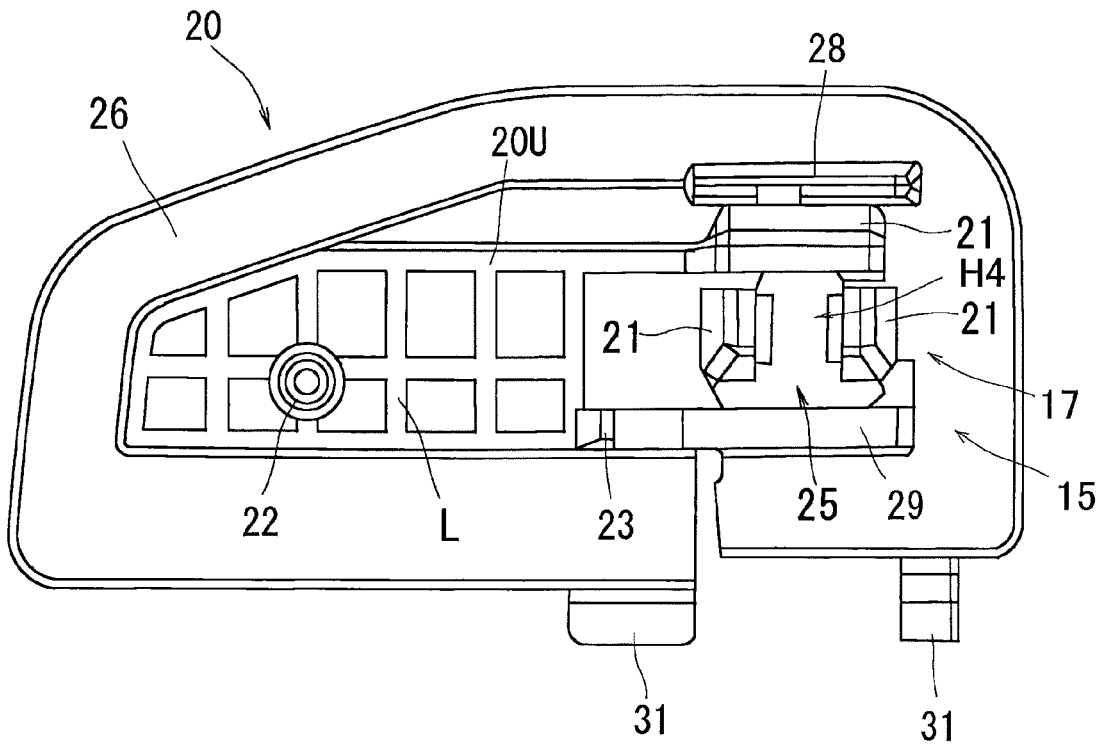
FIG. 5 is a view of an assist grip mounting part and a coat hook part before a reinforcing plate is attached, viewed from the back side (vehicle outside)
Figure 8A:
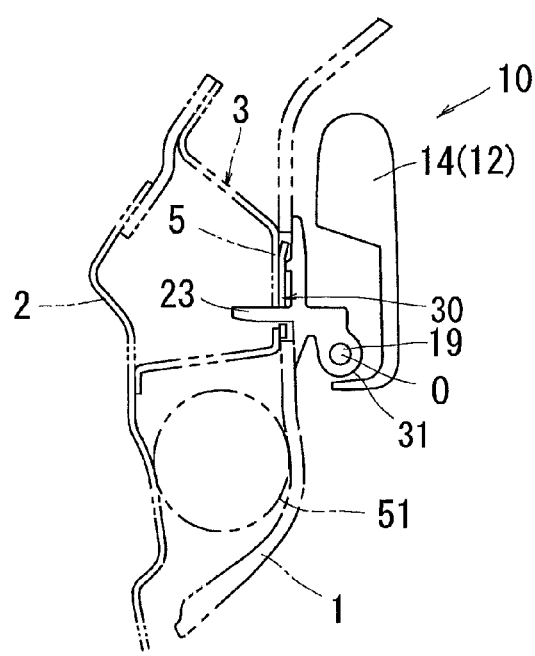
FIG. 8(a) is a sectional view taken along the line H-H of FIG. 3.
Figure 8B:
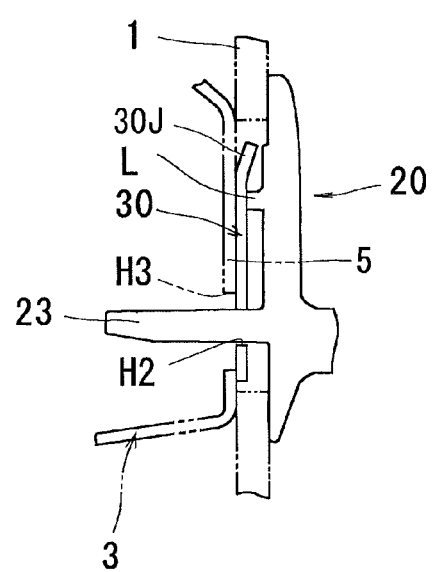
FIG. 8(b) is an enlarged view of a coat hook part and a portion around the coat hook part shown in FIG. 8(a)

As shown in FIGS. 3, 5 and 8(a), in the lower end portion of the mounting part 15, a support part 31 for insertingly supporting the pin 19 is formed.

Between the leg part 13 of the assist grip 10 and the mounting part 15, a coil spring 50 for rotationally urging the leg part 13 around the axis 0 is interposed, and the coil spring 50 is placed around the pin 19.

The rotationally urged leg part 13 (and the body part 12) is received by a wall portion of the storage recess 1D and is stored in the storage recess 1D. The passenger uses the assist grip 10 by rotating the gripping part 14 downward around the axis 0 against the urging force of the coil spring 50. When the gripping is released, the assist grip 10 is rotated upward around the axis 0 by the urging force, and is stored in the storage recess 1D.

As shown in FIGS. 4, 6, 7, 8(a) and 8(b), a support bracket 3 for supporting the assist grip 10 is joined welded to the roof side inner panel 2. The support bracket 3 is formed by bending a metal sheet into a trapezoidal shape in cross section, and the top portion of the trapezoidal shape is configured so as to serve as the mounted part 5.

Figure 10:
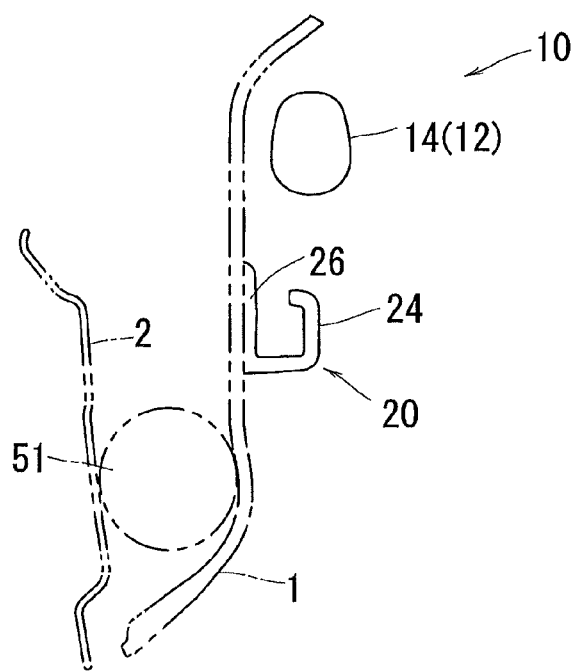
FIG. 10 is a sectional view taken along the line C-C of FIG. 3.

The coat hook part 20 projects from the one mounting part 15 (the mounting part on the vehicle front side of the paired mounting parts 15) side toward the other mounting part 15 (the mounting part on the vehicle rear side of the paired mounting parts 15) side so that the passenger can hang a coat such as a jacket on the coat hook part 20. As shown in FIGS. 3 and 10, the coat hook part 20 includes a support wall 26 and a hook 24 projecting from the front surface of the support wall 26.

The support wall 26 is formed into a trapezoidal plate shape so that the upper edge thereof is located in a lower portion toward the other mounting part 15, and is provided integrally with the one mounting part 15. Thereby, the number of parts can be decreased, and the construction can be simplified. On a back surface 20U of the coat hook part 20 (the back surface of the support wall 26), a lattice-shaped reinforcing rib L is formed in a portion excluding the peripheral part of the support wall 26 (refer to FIGS. 5 and 11).

Figure 6:
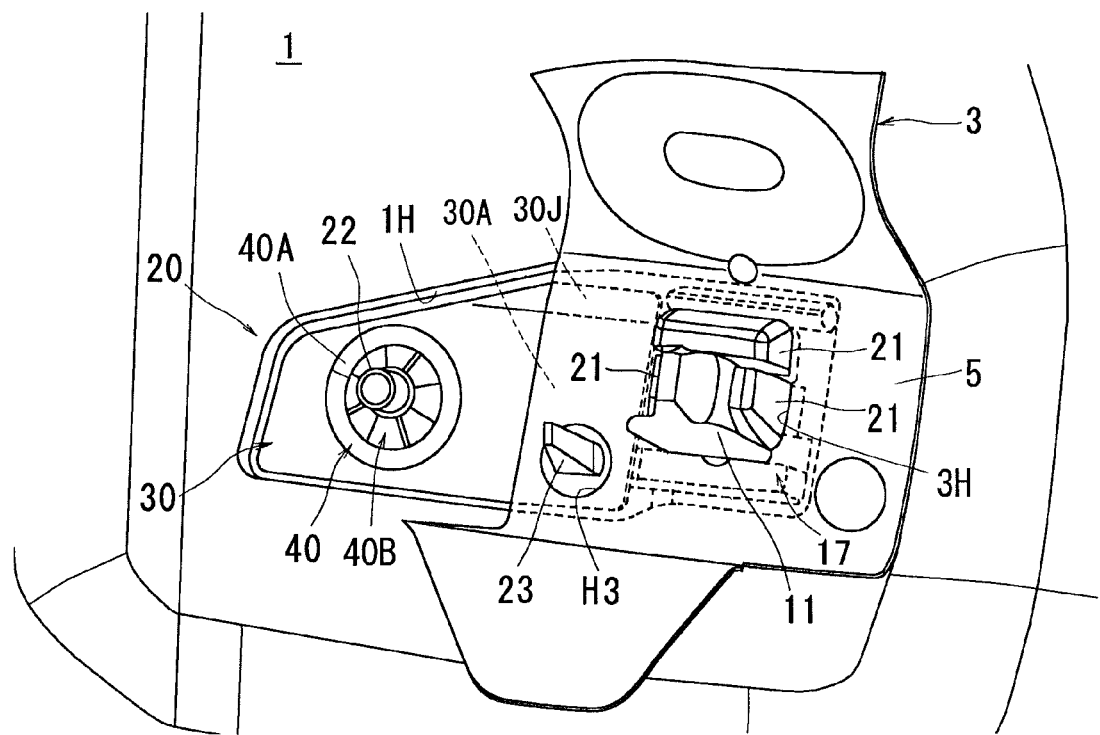
FIG. 6 is a perspective view of an assist grip mounting structure, viewed from the back side (vehicle outside), which is a partially enlarged perspective view of FIG. 4.
Figure 11:
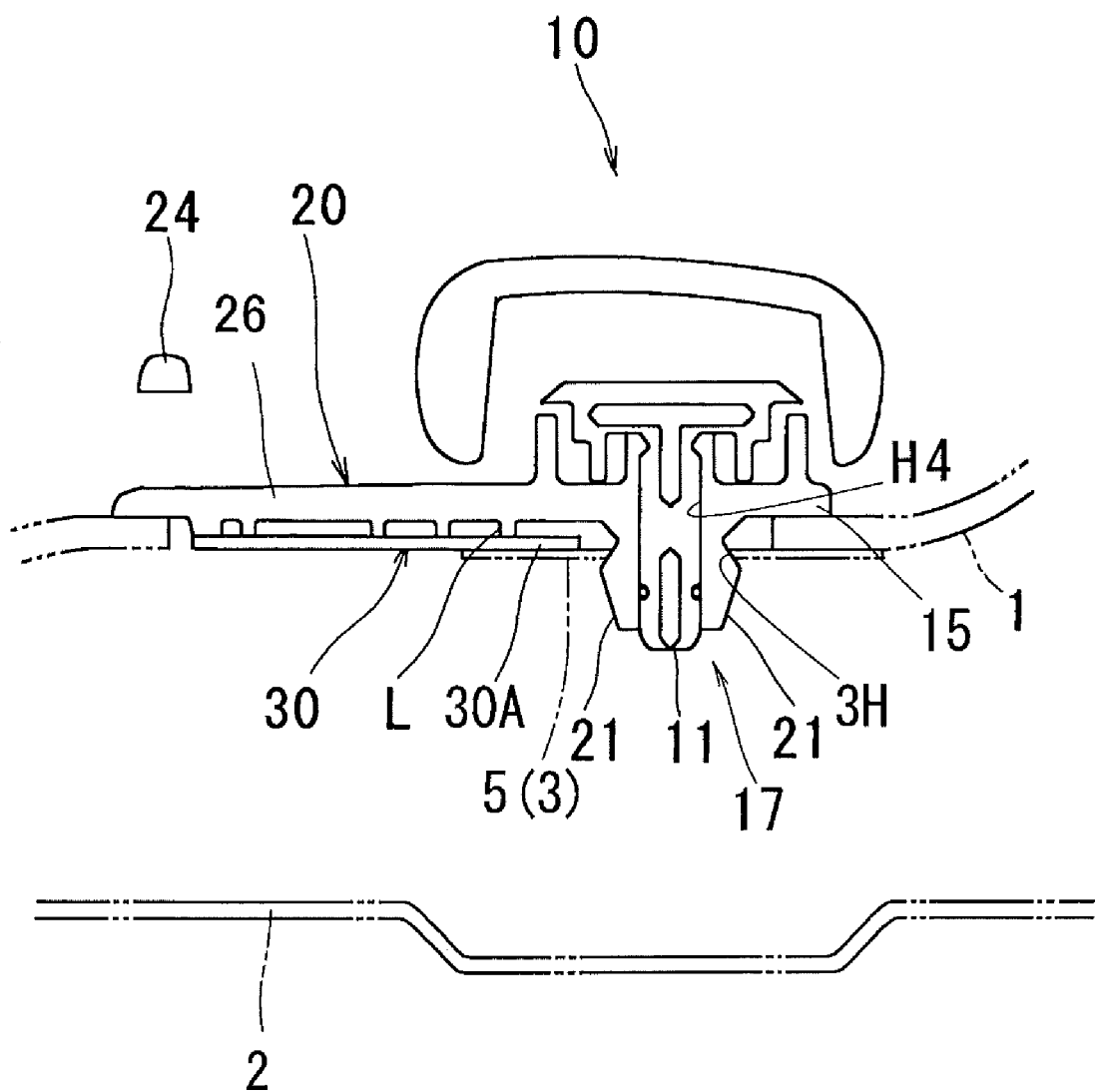
FIG. 11 is a sectional view taken along the line F-F of FIG. 3.

As shown in FIGS. 5, 6 and 11, an engagement part 17 is formed in the one mounting part 15 of the assist grip 10, and an engagement hole 3H engaging with the engagement part 17 is formed in the one mounted part 5 of the support bracket 3. The engagement part 17 includes a rectangular through hole H4 formed in the one mounting part 15 and a plurality of engagement claws 21 projecting from the peripheral part of the through hole H4 to the roof side inner panel 2 side.

The engagement claws 21 are inserted in the engagement hole 3H, and an insertion member 11 is inserted through the through hole H4 from the vehicle compartment interior side and comes into a portion 25 (refer to FIG. 5) between the engagement claws 21 while pushing the engagement claws 21 open, whereby the engagement claws 21 are engaged elastically with the engagement hole 3H. The insertion member 11 is formed so as to have a U-shaped transverse cross section the upper side of which is open (refer to FIG. 7).

As shown in FIGS. 5 and 11, the members of the pair of engagement claws 21 of the plurality of engagement claws 21 are located on both sides of the through hole H4 in the lengthwise direction of the gripping part 14 and are opposed to each other in the lengthwise direction. These paired engagement claws 21 are each formed into a rectangular shape that is long in the up and down direction in the transverse cross section. The paired engagement claws 1 are pushed open in the direction such that the paired engagement claws 1 are separated from each other by the insertion member 11 coming into the portion 25 between the paired engagement claws 21. One separate engagement claw 21 is located on the upper side of the paired engagement claws 21, and is provided so as to have a length ranging from the one engagement claw 21 side to the other engagement claw 21 side. This engagement claw 21 is formed into a rectangular shape that is long in the lengthwise direction of the gripping part 14 in the transverse cross section.

Figure 7:
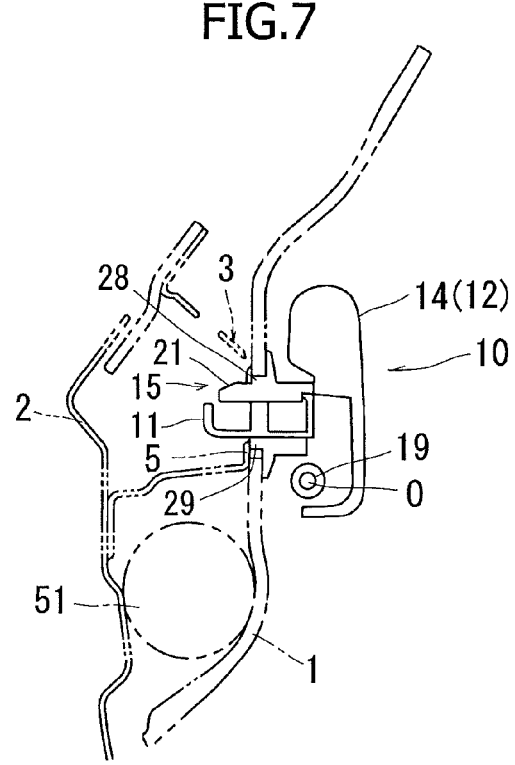
FIG. 7 is a sectional view taken along the line B-B of FIG. 3.

On the back surface of the mounting part 15, a pair of upper and lower contact parts 28 and 29 that come into contact with the mounted part 5 is projectingly provided (refer to FIG. 7). The contact part 28 on the upper side is located on the upper side of the one separate engagement claw 21, and is formed so as to be long in the lengthwise direction of the gripping part 14. The contact part 29 on the lower side is located on the lower side of the paired engagement claws 21, and is formed so as to be long in the lengthwise direction of the gripping part 14.

Also, a metallic reinforcing plate 30 for reinforcing the coat hook part 20 is provided so as to overlap the back surface 20U of the coat hook part 20. As shown in FIGS. 4 and 6, the roof lining 1 is formed with an opening 1H that exposes the reinforcing plate 30 on the back side of the coat hook part 20. Of the upper edge of the reinforcing plate 30, the upper edge portion on the other mounting part 15 side tilts so as to be located in a lower portion toward the other mounting part 15 in such a manner as to be parallel with the upper edge of the coat hook part 20. An upper end part 30J on the one end part 30A side of the reinforcing plate 30 is tilted by being bent to the vehicle compartment interior side (refer to FIG. 8(*b*)).

Figure 9A:
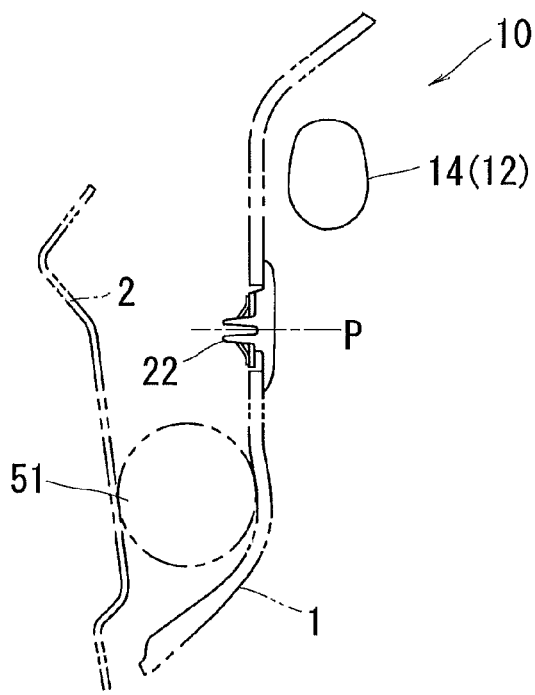
FIG. 9(a) is a sectional view taken along the line G-G of FIG. 3.
Figure 9B:
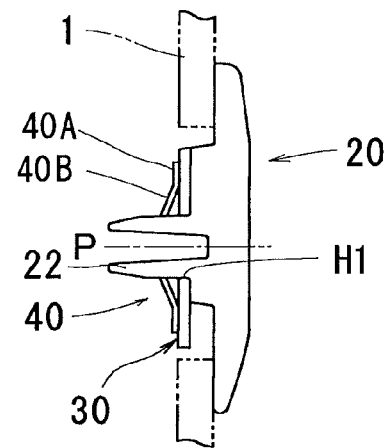
FIG. 9(b) is an enlarged view of a coat hook part and a portion around the coat hook part shown in FIG. 9(a)

As shown in FIGS. 5, 6, 9(*a*) and 9(*b*), a cylindrical first protrusion 22 projects from the back surface 20U in a substantially central portion of the coat hook part 20, and a circular first insertion hole H1 is formed in the reinforcing plate 30. The first protrusion 22 is inserted through the first insertion hole H1, and a speed nut 40 (corresponding to a retaining member) for preventing the first protrusion 22 from coming off the first insertion hole H1 is attached to the first protrusion 22.

The speed nut 40 includes a circular ring-shaped attachment seat 40A and a plurality of spring plates 40B that are located radially with respect to an axis P of the attachment seat 40A and extend from the inner peripheral portion of the attachment seat 40A toward the outside in the axis direction. The spring plates 40B are tilted so as to be located on the axis P side toward the outside in the axis direction, and the tip end portions of the spring plates 40B are located with a space provided therebetween in the radial direction of the attachment seat 40A.

The speed nut 40 is placed on the first protrusion 22 from the attachment seat 40A side. The attachment seat 40A comes into contact with the back surface 20U of the reinforcing plate 30, and the spring plates 40B are pushed open by the first protrusion 22, whereby the tip end portions of the spring plates 40B are brought into contact under pressure with the outer peripheral surface of the first protrusion 22 by the elastic force.

Thereby, the coat hook part 20 can be reinforced by the reinforcing plate 30 overlapped on the back surface 20U of the coat hook part 20. As a result, when the curtain airbag 51 is expanded and deployed, even if the coat hook part 20 receives a pressing force applied from the curtain airbag 51 via the roof lining 1, the coat hook part 20 can withstand the pressing force, so that the coat hook part 20 can be made less liable to be broken.

Also, before the paired mounting parts 15 of the assist grip 10 are attached individually to the paired mounted parts 5 of the support bracket 3, the reinforcing plate 30 can be subassembled to the coat hook part 20. Therefore, the reinforcing plate 30 and the coat hook part 20 need not be transported and controlled separately, so that the transportation and control of parts can be simplified.

As shown in FIGS. 6, 8(*a*) and 8(*b*), a second insertion hole H2 is formed in the one end part 30A of the reinforcing plate 30, and a third insertion hole H3 overlapping on the second insertion hole H2 is formed in the mounted part 5 of the support bracket 3. A second protrusion 23 projects from the back surface 20U of the coat hook part 20, and the second protrusion 23 is inserted through the second insertion hole H2 and the third insertion hole H3. The second protrusion 23 is formed so as to have a tapered prismatic shape having a rectangular transverse cross section, and is located near the corner portion of the reinforcing plate 30 at a position lower than the first protrusion 22.

The one end part 30A of the reinforcing plate 30 is fixed so as to be held between the one mounting part 15 of the assist grip 10 and the mounted part 5 of the support bracket 3, so that the one end part 30A of the reinforcing plate 30 and the mounted part 5 are overlapped on each other.

By the above-described configuration, even if a pressing force is applied to the coat hook part 20 from the curtain airbag 51 via the roof lining 1, the positional shift of the reinforcing plate 30 can be avoided, the overlapping portion of the one end part 30A of the reinforcing plate 30, the coat hook part 20, and the mounted part 5 of the support bracket 3 can be secured, and the pressing force can be transmitted reliably to the support bracket 3 and the roof side inner panel 2 via the reinforcing plate 30. Therefore, the coat hook part 20 can further be made less liable to be broken.

The structure of the other mounting part 15 is configured so as to be almost the same as the structure of the one mounting part 15.

Having thus described certain embodiments of the present invention, it is to be understood that the invention defined by the appended claims is not to be limited by particular details set forth in the above description as many apparent variations thereof are possible without departing from the spirit or scope thereof as hereinafter claimed. The following claims are provided to ensure that the present application meets all statutory requirements as a priority application in all jurisdictions and shall not be construed as setting forth the full scope of the present invention.

What is claimed is:

1. An assist grip mounting structure comprising:
a pair of mounting parts of the assist grip attached individually to a pair of mounted parts disposed on a roof side inner panel covered by a roof lining; and
a coat hook part projecting from one of the mounting parts, wherein:
a support bracket for the assist grip is joined to the roof side inner panel, and the mounted part is formed on the support bracket, and the roof lining is disposed on a vehicle compartment interior side of the roof side inner panel and the support bracket;
a curtain airbag is provided below the support bracket and between the roof side inner panel and the roof lining, the curtain airbag comprising a bag body that is expanded in the case of collision and is deployed to the vehicle compartment interior side while pushing the edge of the roof lining open;
the coat hook part projects from the mounting part on the vehicle front side of the paired mounting parts side toward the mounting part on the vehicle rear side of the paired mounting parts side;
a reinforcing plate for reinforcing the coat hook part is overlapped on a back surface of the coat hook part, and one end part of the reinforcing plate is fixed so as to be held between the one mounting part and the one mounted part, and the one end part of the reinforcing plate and the one mounted part are overlapped on each other; and
when a pressing force is applied from the curtain airbag to the coat hook part via the roof lining, the pressing force from the curtain airbag is transmitted to the support bracket and the roof side inner panel via the reinforcing plate.

2. The assist grip mounting structure according to claim 1, wherein the coat hook part is provided integrally with the one mounting part.

3. The assist grip mounting structure according to claim 1, wherein
a first protrusion projects from the back surface of the coat hook part;
a first insertion hole is formed in the reinforcing plate, and the first protrusion is inserted through the first insertion hole; and
a retaining member for preventing the first protrusion from coming off the first insertion hole is attached to the first protrusion.

4. The assist grip mounting structure according to claim 1, wherein
a second insertion hole is formed in the one end part of the reinforcing plate;
a third insertion hole overlapping on the second insertion hole is formed in the mounted part;
a second protrusion projects from the back surface of the coat hook part; and
the second protrusion is inserted through the second insertion hole and the third insertion hole.

5. The assist grip mounting structure according to claim 2, wherein
a first protrusion projects from the back surface of the coat hook part;
a first insertion hole is formed in the reinforcing plate, and the first protrusion is inserted through the first insertion hole; and
a retaining member for preventing the first protrusion from coming off the first insertion hole is attached to the first protrusion.

6. The assist grip mounting structure according to claim 3, wherein one end part of the reinforcing plate is fixed so as to be held between the one mounting part and one mounted part, and the one end part of the reinforcing plate and the one mounted part are overlapped on each other.

7. The assist grip mounting structure according to claim 6, wherein
a second insertion hole is formed in the one end part of the reinforcing plate;
a third insertion hole overlapping on the second insertion hole is formed in the mounted part;
a second protrusion projects from the back surface of the coat hook part; and
the second protrusion is inserted through the second insertion hole and the third insertion hole.

8. The assist grip mounting structure according to claim 7, wherein
a support bracket for the assist grip is joined to the roof side inner panel; and
the mounted part is formed on the support bracket.

* * * * *